UNITED STATES PATENT OFFICE.

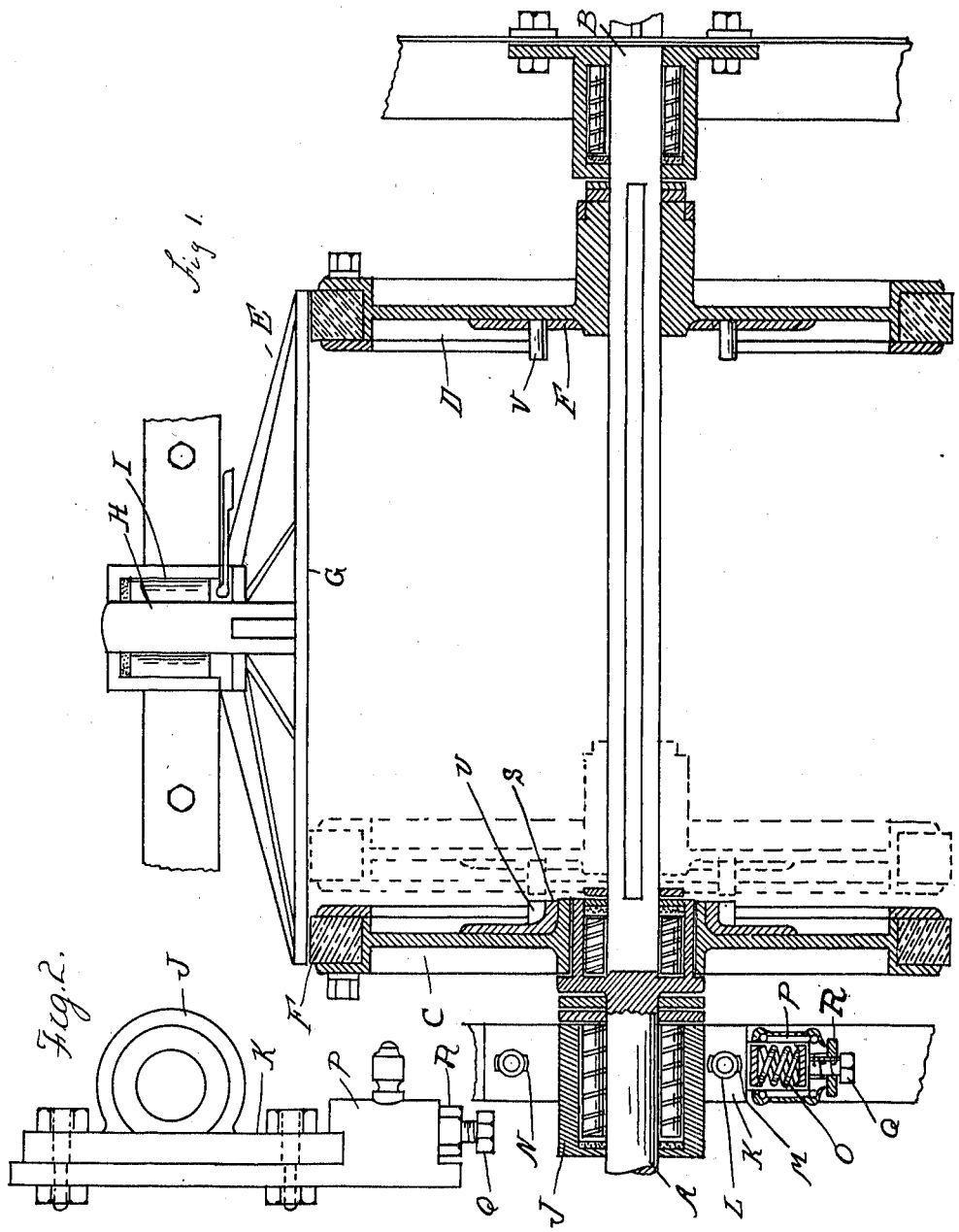

WILLIAM A. DE SCHAUM, OF DETROIT, MICHIGAN.

DRIVE MECHANISM.

1,099,239.  Specification of Letters Patent.  Patented June 9, 1914.

Application filed August 30, 1913.  Serial No. 787,541.

*To all whom it may concern:*

Be it known that I, WILLIAM A. DE SCHAUM, a citizen of the United States of America, residing at Detroit, in the county of Wayne and State of Michigan, have invented certain new and useful Improvements in Drive Mechanism, of which the following is a specification, reference being had therein to the accompanying drawings.

My invention relates to drive mechanisms and more particularly to a drive mechanism of the friction type in which are two or more spaced members that are adapted to be driven the one from another by an intermediate transmission. With this type of drive mechanism, as there is an uneven wear between the engaging faces of the spaced members and the transmission, when the parts become worn there is a tendency to avoid proper friction contact between the transmission and the friction members being made.

My invention has among the objects thereof to provide a construction in which proper friction contact is maintained between the various parts of the drive mechanism, irrespective of the unequal wear upon the several friction members.

Also among the objects of the invention is to provide a construction in which a direct drive may be obtained between the drive and driven members and which will permit changing from an intermediate speed to the direct drive without a sudden gripping of the parts.

Other objects of the invention will more fully hereinafter appear.

To this end the invention resides in the peculiar construction, arrangement and combination of parts as hereinafter set forth and as particularly pointed out in the claims.

In the drawings,—Figure 1 is a side elevation of the transmission mechanism embodying the invention; and Fig. 2 illustrates certain details of construction.

In the embodiment of my invention shown in the drawings A designates the drive shaft and B the driven shaft, journaled in any suitable bearings to independently rotate. Fixed to the shaft A is a friction member C, while connected to the shaft B to rotate therewith, but longitudinally adjustable thereupon, is a friction member D. The latter is driven from the member C by a suitable transmission E. The friction members C D are illustrated as comprising disks having the peripheries thereof of suitable friction material F, while the transmission E is in the form of a disk provided with a comparatively flat bearing face G with which the peripheries of the members C D are adapted to frictionally engage. The disk E is mounted upon a shaft H journaled in a bearing I but longitudinally adjustable therein toward and from the friction members C D in the usual manner.

The friction periphery of the member D is subjected to greater wear than the bearing face of the member C, due to shifting of the friction disk D to effect a change of speed or the like, and if the shafts A and B were in alinement and the axes of the members C, D and E were fixed in relation to each other, when the friction surface of the shiftable member became worn the member C would prevent proper driving contact being made between the transmission disks and the member D, especially on direct drive. Thus it will be readily apparent upon reference to the drawing that if the disk E was, for instance, in the position shown in dotted lines in Fig. 1 and the friction surface thereof was worn so that the diameter of the member D was less than that of the disk C, the latter would prevent the transmission disk E from properly engaging the friction surface of the shiftable disk, providing the shafts A and B were in alinement and the member H rotated about a fixed axis.

With my improved construction I so mount the friction disks as to provide a relative yielding thereof. In the structure illustrated the shaft A to which the member C is connected is journaled in a suitable bearing J which is movably connected to a support K by bolts L which pass through elongated openings M in the attaching portion N of the bearing J.

O is a spring arranged within a housing P and acting against one end of the attaching section N to form a yielding abutment therefor when the bearing is moved in a direction away from the disk E. Tension of this spring may be regulated by means of a set-screw Q and a lock-nut R.

The parts are so adjusted that normally the spring O will retain the bearing J at a position in which the shafts A and B are alined, but if the member E is moved toward the disks C and D, the transmission disk engages the bearing surface of the member C before it contacts with the shiftable friction disk and the yieldable mounting for the bearing J will permit the latter and the disk C to be moved inward transversely of its axis of rotation until the disk D has a proper frictional engagement with the member E.

While I have shown a simple and efficient arrangement of parts for permitting a relative movement of the disks C and D transversely of their axes, other means may be employed for accomplishing this result, and I do not consider my protection limited to the structure shown, or as being applicable merely to the specific drive mechanism of the drawings.

The inner faces S T of the disks C and D are provided with coöperating clutch teeth U V, and by shifting the disks D longitudinally of the shaft B until the clutch teeth engage, a direct drive will be effected between the drive and driven shafts. In order to permit of the coöperating clutch parts to be engaged without a sudden jerk or jar upon the transmission, I form the disk E of a larger diameter than the drive and driven members. Therefore, when the disks C and D are in the position shown in dotted lines in Fig. 1, their peripheral speed will be substantially the same, eliminating the sudden jar which would be effected if the drive and driven members were coupled together upon rotating at considerably different speeds. Upon the engaging of the coöperating clutch teeth the transmission disk E is moved out of engagement with the drive and driven disks, any suitable shifting mechanisms being employed for actuating the disks D and C.

What I claim as my invention is:—

1. In a friction drive mechanism, the combination with drive and driven friction members, of a transmission member adapted to engage said members and forming the driving connection therebetween, one of said friction members being yieldable independently of the other, in a plane transverse to the axis of the yieldable friction member.

2. In a friction drive mechanism, the combination with a drive and a driven friction member, of a transmission member adapted to engage said members and forming the driving connection therebetween, and a bearing for one of said friction members yieldable in a plane transverse to the axis thereof.

3. In a friction drive mechanism, the combination with drive and driven shafts, of a friction member secured to each of said shafts, a transmission disk forming the driving connection between said friction members, and a bearing for one of said shafts yieldable in a plane transverse to the axis thereof.

4. In a friction drive mechanism, the combination with a drive and driven members having friction peripheries, of a transmission disk having a driving surface adapted to engage the peripheries of the drive and driven members, one of said members being adapted to be shifted across the bearing surface of the transmission disk, and a bearing for the other member yieldable in a plane transverse to the axis thereof.

5. In a friction drive mechanism, the combination with a drive and a driven member having friction peripheries, of a transmission disk adapted to be adjusted into and out of engagement with said members and having a friction surface adapted to engage the peripheries of the drive and driven members, and a bearing for one of said members permitting the adjustment of said member by and in the direction of movement of said friction disk.

6. In a friction drive mechanism, the combination with a drive and a driven friction member, of a transmission member adapted to engage said friction members and forming the driving connection therebetween, a bearing for one of said members, yieldable in a plane transverse to the axis of movement of said friction member, and means for regulating the pressure required for effecting a yielding of said bearing.

In testimony whereof I affix my signature in presence of two witnesses.

WILLIAM A. DE SCHAUM.

Witnesses:
Wm. J. Belknap,
James P. Barry.